Patented Oct. 12, 1954

2,691,649

UNITED STATES PATENT OFFICE 2,691,649

DIAZOTIZING OF GLYCINE ESTERS

John A. S. Hammond, Baltimore, Md., assignor to National Distillers Products Corporation, New York, N. Y., a corporation of Virginia No Drawing. Application December 14, 1951, Serial No. 261,739

7 Claims. (Cl. 260—239)

The present invention relates to the diazotization of glycine esters and provides improvements in the previously proposed methods for diazotizing such compounds.

More particularly, the invention provides improvements in the previously proposed method whereby an acid salt of glycine ester is reacted with a metal nitrite, sodium nitrite, for instance, in the presence of a mineral acid, water, and a non-aqueous solvent for the resultant diazotized glycine ester.

In conventional practice, this process has been carried out by mixing the salt of the glycine ester with the nitrite in aqueous solution and the non-aqueous solvent, chilling the mixture well below room temperature, usually below 0° C. and gradually adding the acid to the pre-cooled mixture, while maintaining the mixture at a low temperature.

It has been recognized that the diazotized glycine esters are readily decomposed by aqueous acid solutions and it has been considered necessary, even at the low temperatures employed, to effect a partial diazotization in successive steps, i. e., adding the acid in successive increments with intermediate separation of the diazotized product. This procedure has been time consuming and costly and further has resulted in relatively low yields.

The reaction involved is exothermic and, as heretofore carried out, the evolution of heat is not uniformly spread throughout the reaction period but occurs in undue amounts in the early stages of the reaction. This has necessitated the pre-cooling of the reactants to a very low temperature and, for this purpose, cooling baths, having a temperature as low as −23° C. have been used. Such refrigeration has been found especially costly, but nevertheless has not wholly removed the hazard of large scale operation.

It is a primary object of my present invention to avoid the necessity of low temperature operation. A further object is to avoid the necessity of carrying out the process in successive steps and a still further object is to increase the yield of the diazotized glycine ester.

These and other advantages, as will hereinafter appear, are attained, in accordance with my present invention, by a radical change in the order in which the several constituents are mixed. I have found quite unexpectedly that, if, contrary to conventional practice, the acid is first mixed with the nitrite solution and the non-aqueous solvent, and the salt of the glycine ester is thereafter gradually added to the resultant mixture, the necessity for maintaining the mixture at low temperatures and stepwise diazotization are avoided and that, by this procedure, surprisingly high yields are obtained.

Predicated on this discovery, the process of my present invention in its broader aspect comprises the steps of premixing the aqueous nitrite solution, the acid, and the non-aqueous solvent, and thereafter slowly adding to the mixture, the salt of the glycine ester. The operation is with advantage, carried out at room temperature, though somewhat lower temperatures may be employed at the added expense of cooling below room temperature and a somewhat lower reaction rate.

The invention is applicable generally to the diazotization of glycine esters and contemplates the use of the various reactants, acids, non-aqueous solvents, buffers, and the like, useful in the above-noted conventional procedure. I have, with particular advantage, used sodium nitrite, sulfuric acid, and ethyl ether in diazotizing ethyl glycine, the glycine ester being added as the ethyl glycine hydrochloride, and the invention will be more particularly described and illustrated by reference to such operations.

It will be understood, however, that in place of ethyl glycine hydrochloride, the salts of other acids may be used, for instance, the sulfate, phosphate, acetate, propionate, or the like, of the glycine ester. Also, these salts of other esters of glycine may be used, the invention being applicable to any aminoacetic acid ester having the formula

in which R is the hydrocarbon radical. It is especially useful in the diazotizing of esters of this type in which R is an alkyl radical of from 1 to 6 carbon atoms.

As previously indicated, it is presently preferred to use sodium nitrite as the nitrite reactant. However, the invention contemplates the use of potassium nitrite, or, in fact, any alkali metal or alkaline earth metal nitrite.

Also, in place of the ethyl ether, any non-aqueous solvent for the resultant diazotized glycine ester, which does not react substantially with the resultant diazotized glycine ester or with the reactants, may be used. It will also be understood that, in place of sulfuric acid, other dilute acidic reactants may be employed which are known to promote the diazotization reaction. The proportions of the several constituents is not critical and, as understood by the art, may be varied over a considerable range.

Illustrated examples of the application of the process are as follows:

*Example I*

2.9 gallons of a solution of 9.1 pounds of sodium nitrite in 2.5 gallons of water, 1.16 gallons of a solution of 440 grams of 95% sulfuric acid made up to the indicated volume of water and 5.8 gallons of ethyl ether were placed in a 20-gallon glass-lined jacketed kettle equipped with a stirrer and thoroughly mixed therein. Water, at a temperature of 12-15° C. was circulated through the jacket and the contents stirred until the mixture reached a temperature of about 18° C.

There was then added to the mixture over a period of 45 minutes, 2.9 gallons of an aqueous solution of 12.1 pounds of ethyl glycine hydrochloride and 350 grams of sodium acetate having a pH of 4.1 and at a temperature of 20° C., the reaction mixture being maintained during the addition at a temperature approximating 20° C. by the cooling water circulating through the jacket.

The mixture was stirred during the addition of the ethyl glycine hydrochloride and, for 15 minutes thereafter, and then permitted to settle to form an ether layer and a water layer. These layers were separated and the water layer was washed with 2 gallons of ethyl ether and a further ether layer separated therefrom. These two ether layers were combined and neutralized by the addition of a 15% sodium carbonate solution. The resultant neutralized wet ether layer was then dried by passing through a bed of calcium carbonate in a small tower and the ether evaporated under a reduced pressure of 8 mm. of mercury at a temperature of 16° C.

By this procedure there was obtained 7.95 pounds of a residue which, upon analysis by the nitrogen evolution method, was found to contain 99.3% by weight of ethyl diazoacetate. This yield amounted to 80.2% with an estimated loss of ethyl diazoacetate during evaporation of the ether of 10-12%.

*Example II*

375 grams of sodium nitrite, 400 cc. of 10% aqueous sulfuric acid solution and 2500 cc. of ethyl ether were placed in a 5 liter glass flask equipped with a stirrer and a cooling bath. The contents of the flask was stirred and cooled to 20° C. and to it was then added 1 liter of an aqueous solution of 500 grams ethyl glycine hydrochloride and 300 grams of sodium acetate having a pH of 4.1. This ethyl glycine hydrochloride solution was added over a period of 45 minutes, the mixture being stirred during the addition and for 15 minutes thereafter, and the temperature being held at 20° C.

The mixture is then permitted to separate into an aqueous layer and an ether layer. The aqueous layer was extracted with 500 cc. of fresh ethyl ether to form a further ether layer. The two ether layers were combined, neutralized with potassium carbonate solution and dried by passing through a tower of calcium chloride, as described in Example I.

The dry neutral ether solution was then distilled to remove the ether at an absolute pressure of 90 mm. of mercury with refluxing through a column packed with helices, the vapors from the tower were passed from a condenser, maintained at a temperature of −20 to −30° C., thereby forming a distillate consisting primarily of ether and containing 11.3 grams of ethyl diazoacetate. The overall yield of ethyl diazoacetate was 90.6%.

As illustrative of the advantages of my present process over conventional procedure, the following example of a process carried out under conventional procedure is given:

*Example III*

40 cc. of an aqueous solution containing 15 grams of sodium nitrite, 150 cc. of ethyl ether and 50 cc. of an aqueous solution containing 25 grams of ethyl glycine hydrochloride, buffered to a pH of 4.5 by the addition of sodium acetate, was added to and mixed in a 250 cc. glass flask equipped with an agitator, thermometer, dropping funnel, and cooling bath. The mixture was cooled with stirred to a temperature of 20° C. and thereafter 20 cc. of a 10% aqueous solution of sulfuric acid was added over a period of 45 minutes, the temperature of the reaction mixture being maintained throughout the period of addition and for 15 minutes thereafter at 20° C. Ethyl diazoacetate was recovered from the reaction mixture by the procedure described in Example II, the yield being only 79.4%.

Using this same equipment, the same constituents and proportions thereof and the identical procedure just described, except that the sulfuric acid was premixed with the nitrite and the ether and the ethyl glycine hydrochloride solution added to that mixture, the yield of ethyl diazoacetate was 86.6%. On repeating this comparative test, in accordance with my present invention, except that the temperature was maintained at 25° C. instead of 20° C., the yield of ethyl diazoacetate was found to be 92.0%.

In each of the foregoing specific examples, sodium acetate was mixed with the ethyl glycine hydrochloride solution prior to mixing with the acid to adjust the pH of the solution to approximately 4 so as to give more nearly comparable conditions. It will be understood, however, that the pH of that solution is not critical and that, therefore, the use of a buffer, as described, is not an essential feature of my process. Further, other well known buffers may be used in place of the sodium acetate where such use of buffers is desired.

Also, it will be understood that in place of the recovery procedure specifically described, other methods may be employed to separate and recover the diazotized glycine ester from the reaction mixture. However, the procedure described has been used for this purpose with particular advantage.

I claim:

1. In a process for diazotizing glycine esters of the formula

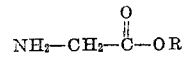

in which R represents a hydrocarbon radical, whereby an acid salt of the glycine ester is reacted with a nitrite of the class consisting of the alkali metal and alkaline earth metal nitrites in aqueous solution in the presence of a mineral acid and a non-aqueous solvent for the resultant diazotized glycine ester, the step of mixing together the aqueous nitrite solution, the acid and the solvent and thereafter gradually adding to the mixture the salt of the glycine ester to be diazotized in aqueous solution.

2. The process of claim 1 in which the salt of the glycine ester is the hydrochloride.

3. The process of claim 2 in which the salt of the glycine ester used is ethyl glycine hydrochloride.

4. The process of claim 3 in which the mineral acid is sulfuric acid.

5. The process of claim 4 in which the non-aqueous solvent is ethyl ether.

6. The process of claim 1 in which the glycine ester is one having the formula $$NH_2-CH_2\overset{O}{\overset{\|}{C}}-OR$$

R being an alkyl radical of 1 to 6 carbon atoms.

7. The process of claim 1 in which the reaction mixture is maintained at room temperature.

References Cited in the file of this patent

UNITED STATES PATENTS

| Number | Name | Date |
|---|---|---|
| 2,013,180 | Koch | Sept. 3, 1935 |
| 2,490,714 | Searle | Dec. 6, 1949 |

FOREIGN PATENTS

| Number | Country | Date |
|---|---|---|
| 727,293 | France | Mar. 21, 1932 |

OTHER REFERENCES

Cain, "Chemistry and Technology of the Diazo Compounds" (1920), pp. 120 to 123.

Saunders, "The Aromatic Diazo Compounds" (Edward Arnold), p. 3 (1949).